Jan. 4, 1949.  P. J. McLAREN ET AL  2,457,910
FLEXIBLE CABLE
Filed Feb. 2, 1946  2 Sheets—Sheet 1
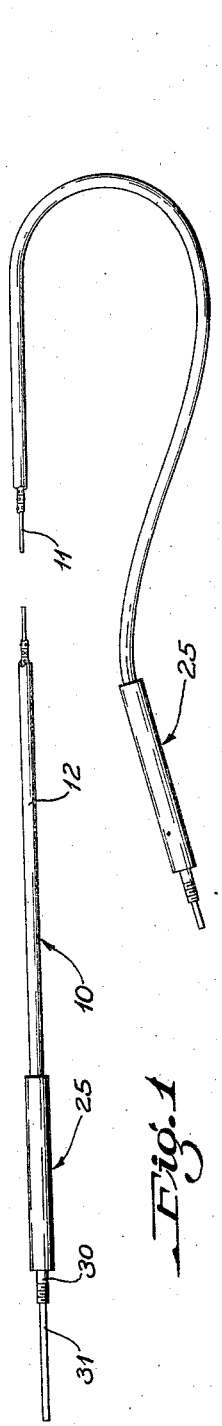
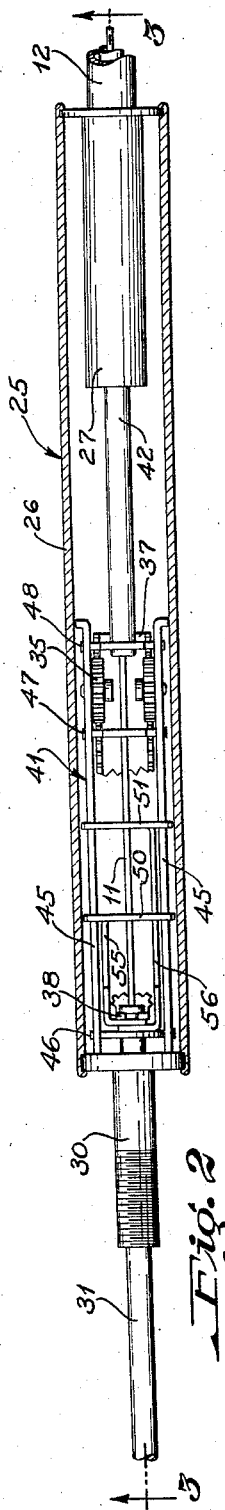
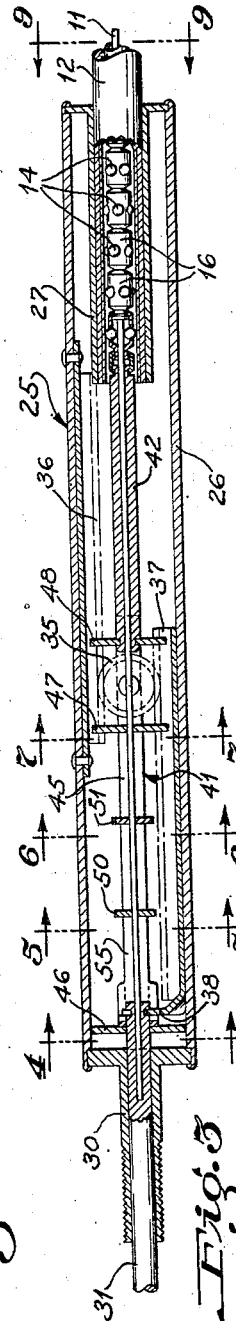
INVENTORS
Peter J. McLaren
John A. Vaughan
Victor A. Svensson
By Mosie, Nolte, Crews & Berry
Attys.

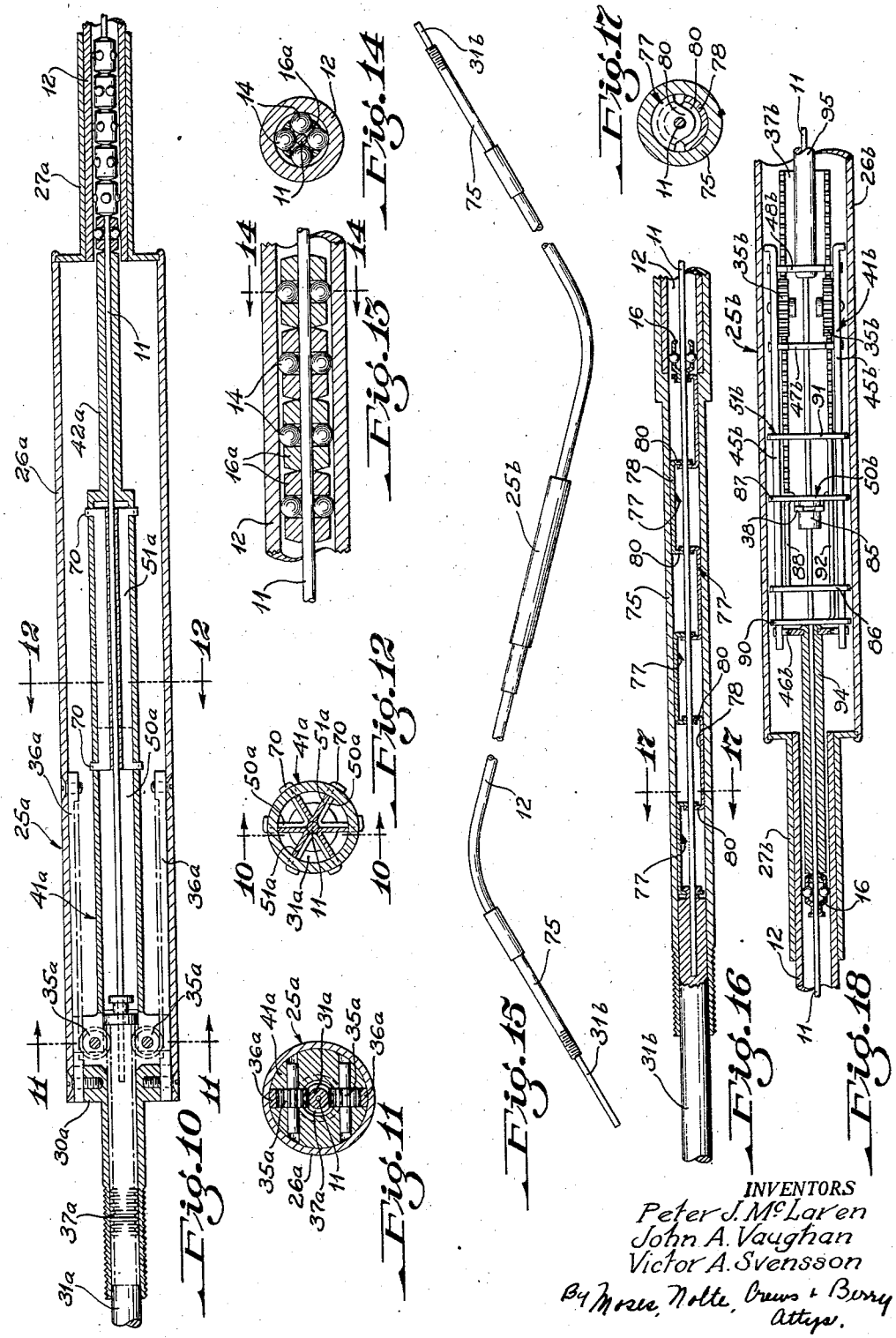

Patented Jan. 4, 1949

2,457,910

UNITED STATES PATENT OFFICE 2,457,910

FLEXIBLE CABLE

Peter J. McLaren, New York, John A. Vaughan, Hempstead, and Victor A. Svensson, New York, N. Y., assignors to The W. L. Maxson Corporation, New York, N. Y., a corporation of New York Application February 2, 1946, Serial No. 645,142

28 Claims. (Cl. 74—501)

1

The present invention relates particularly to flexible cables of the type in which a slender flexible rod in the form of a wire is housed in a sheath, and is moved lengthwise by a pull or push operation at one end of the cable, to control or actuate a device at the other end of said cable.

One object of the present invention is to provide a flexible cable of the general type referred to, which is capable of being acutely bent while permitting efficient transmission of motion therethrough by remote control.

In carrying out the features of the present invention, there is provided in the cable sheath a series of rollable elements, desirably in the form of ball bearings, for supporting and guiding the wire therein, while permitting lengthwise movement of said wire with minimum of friction. These ball bearings are rollably mounted in retainers, and engage not only the wire, but also the inner periphery of the sheath. When the ball bearings are free to roll by bearing friction, they will move along the axis of the wire a distance equal to one-half the longitudinal distance traversed by the wire. To insure ideal rolling conditions, and thereby lengthwise movement of the wire with minimum of resistance, the ball bearings are positively driven along the cable at half the rate of speed of the wire when said wire is actuated lengthwise. This positive movement of the ball bearings is effected through the retainers by a regulating mechanism disposed either at one or each end of the cable or intermediate thereof. The series of ball bearings stops short of this regulating mechanism, so that the portion of the wire beyond this driving mechanism is unsupported by these ball bearings. Means are provided for guiding and supporting this portion of the wire against buckling, while said wire is being pushed.

Various other objects, features and advantages of the invention will be apparent from the following particular description, and from an inspection of the accompanying drawings, in which:

Fig. 1 is an elevational view of a form of flexible cable assembly having a regulating device at one or both ends, and embodying the present invention;

Fig. 2 is a longitudinal section through a form of regulating mechanism embodying the present invention, and constituting part of the cable assembly shown in Fig. 1;

Fig. 3 is a longitudinal section of the regulating mechanism taken on lines 3—3 of Fig. 2;

Figs. 4, 5, 6 and 7 are transverse sections of

2 the regulating mechanism taken on lines 4—4, 5—5, 6—6 and 7—7 of Fig. 3, respectively;

Fig. 8 is a longitudinal detail section of the cable shown in Figs. 2 and 3, but on a larger scale;

Fig. 9 is a transverse section of the cable taken along the lines 9—9 of Fig. 3;

Fig. 10 is a longitudinal section through another form of regulating mechanism embodying the present invention;

Figs. 11 and 12 are transverse sections of the regulating mechanism taken along the lines 11—11 and 12—12 of Fig. 10, respectively;

Fig. 13 is a longitudinal detail section of a cable having another form of ball retainers embodying the present invention;

Fig. 14 is a transverse section of the cable taken along the lines 14—14 of Fig. 13;

Fig. 15 is an elevational view of another form of flexible cable assembly having a regulating device intermediate its ends, and embodying the present invention;

Fig. 16 is a longitudinal section of the end wire guide of the cable assembly shown in Fig. 15;

Fig. 17 is a transverse section of the end wire guide taken along the lines 17—17 of Fig. 16; and Fig. 18 is a longitudinal section of the intermediately disposed regulating device of the cable assembly of Fig. 15.

Referring to Figs. 1-9 of the drawings, the flexible cable assembly 10 comprises a flexible slender rod 11 in the form of a wire adapted to be reciprocated longitudinally within a housing or sheath 12 by actuation at one end of the cable assembly, to cause corresponding actuation of a device at the other end of said cable assembly. The housing or sheath 12 may be flexible or may be rigid, according to the use to which the cable assembly is to be put. To insure efficiency of operation of the cable assembly, the wire 11 is supported and guided within the sheath 12 by a plurality of annularly arranged balls 14, surrounding said wire and disposed in rolling contact with the wire and the inner peripheral surface of said sheath. These balls 14 are desirably spaced to avoid coincidence with the serrations inherent in some types of flexible sheaths as shown in Fig. 8, and are maintained in predetermined orderly groups, each comprising four balls circularly arranged around the wire 10, and each supported in a respective cage or retainer 16. In the form of the invention shown in Figs. 1-9, each of the ball cages 16 has a cylindrical intermediate body section 17 apertured to receive the bearing balls 14, a flange link head 18 at one end, and an aperture 20 at the other end. The cages 16 are interlinked end to end through these link leads 18 and apertures 20 in such a way as to permit relative pivotal movement of these cages as the cable is bent.

With the arrangement as shown, for a given lengthwise movement of the wire 11, the balls 14 rolling between the moving wire and the sheath 12 will be displaced in the absence of any slippage a distance equal to one half the movement of said wire. Since the chain of cages 16 is free to move lengthwise in the sheath 12, the balls 14 rolling freely in the retaining recesses of said cages will carry said cages along the wire at one half the rate of the wire.

Since the efficiency of operation of the cable depends on the half-rate movement of the balls 14 relative to the wire 11, it is desirable to insure the proper relative displacement by providing a mechanism operable to displace by positive drive action the cages or retainers 16 at one half the displacement rate of the wire. To this end, a regulating mechanism 25 is incorporated in the complete flexible cable assembly 10. In the construction of Figs. 1–9, this regulating mechanism 25 is shown mounted at each end of the cable assembly and attached to the sheath 12, and comprises a housing 26 in the form of a cylindrical tube attached at its inner end to the outside of said sheath by means of a flanged sleeve 27. The sheath 12 extends into the housing 26, and is embraced in said housing by the tubular portion of the flanged sleeve 27. The housing 26 is rigidly secured to the sheath 12, as for example, by welding or brazing.

The opposite or outer end of the housing 26 has secured thereto a flanged hub 30 adapted to serve as a slide guide for a rigid rod 31 fastened to the end of the wire 11, and serving to facilitate attachment of said wire to a control or controlled element. This hub 30 is provided with screw threads or other suitable means to facilitate rigid mounting of the end of the cable assembly 10.

The half-rate movement of the retainers or cages 16 is achieved by the use of a pair of pinions 35 rolling between a fixed rack 36 secured to one side of the housing 26, and a movable rack 37, which engages the end of rod 31 through a forked arm 38 on said rack, and which is adapted to move with said rod along the other side of said housing. These racks 36 and 37 are of U-shaped construction and define rack teeth along the side arms thereof. The pinions 35 which mesh with these rack teeth are pivotally mounted on a carriage 41 connected to the chain of ball retainers 16 by a tubular member 42 through which the wire 11 slides. Therefore, when rod 31 is actuated lengthwise, as for example, to the right (Figs. 2 and 3), the wire 11 and rack 37 are also displaced to the right therewith. This will cause the pinions 35 to rotate and roll along the fixed rack 36, so that the carriage 41 carrying said pinions is displaced to the right at half the rate of the wire 11. This half-rate movement of the carriage 41 is in turn transmitted to the chain of ball retainers 16 through the tubular member 42, so that the proper rolling movement of the balls 14 with respect to the moving wire 11 and the sheath 12 is assured, to assure endwise movement of said wire with minimum of friction.

Since the carriage 41 moves at half the rate of the wire 11, it follows that when the regulating mechanism 25 is in its extended position as shown, there will be an unsupported section of said wire of approximately one half the length of total permissible wire travel. It is necessary, therefore, to provide means to prevent the buckling collapse of this section of the wire 11 against the inner wall of housing 26 when actuating pressure is applied to rod 31 against a resistance at the remote end of the cable assembly 10.

For supporting the section of the wire 11 in the housing 26 against buckling, the carriage 41 comprises a pair of parallel rails 45 rigidly connected to each other by a series of spacers or cross-pieces 46, 47 and 48, welded, brazed, or otherwise affixed to said rails. Rail spacer 46 has opposite circular ends conformably engaging the inner periphery of the housing 26 and slidable therealong. This rail spacer 46, besides serving as part of the frame structure by which the rails 45 are held together, also serves as a guide for one end of the carriage 41 by the engagement of the rails 45 with the sides of said rail spacer 46, and also serves as a guide for the rod 31, which slides therethrough. Rail spacers 47 and 48 are contoured to slide between the teeth of the fixed rack 36 and the movable rack 37, to maintain thereby alignment of rack 37 with pinions 35 throughout the entire stroke of the regulating mechanism 25. Rail spacer 47 serves not only as a cross-brace for the carriage 41, but also as a support for the wire 11 which passes therethrough. The rail spacer 48 has the end of the tubular member 42 secured thereto, so that movement of the carriage 41 is transmitted to the chain of ball retainers 16 through said tubular member.

Intermediately disposed between the rail spacers 46 and 47, and having slide engagement with rails 45 are slidable wire guides 50 and 51. These wire guides 50 and 51 have end slots 52 for slidably receiving the rails 45, and are contoured at their ends for slide engagement with the inner wall of housing 26. The spacing of the wire guides 50 and 51 is such that the wire 11, even when under compression to the physical limit encountered in the operation of the entire cable assembly, will be effectively braced against buckling. The wire guide 50 is provided with an arm 55 extending along one of the rails 45, and bifurcated at its outer end to straddle rod 31. The wire guide 51 has an arm 56 extending along the other rail 45, passing through one of the slots 52 in the wire guide 50, and bifurcated at its outer end to straddle the rod 31 in abutting relationship with the bifurcated end of the guide arm 56. The two bifurcated ends of the guide arms 55 and 56 are maintained in abutment with the rail spacer 46, and the rails 45 with the flange of the hub 30 by the upward bifurcated extension 38 at one end of the movable rack 37, embracing the inner end of the rod 31. Thus, displacement of this rod 31 to the left from the extreme position shown in Figs. 2 and 3 is prevented.

When it is desired to transmit motion through the cable, rod 31 is actuated to the right (Figs. 2 and 3), and this causes corresponding displacement of rack 37 and wire 11 to the right. Pinions 35 rolling between racks 36 and 37 will move the carriage 41 in the same direction but at half the rate of the wire 11. Carriage 41 will in turn drive the ball retainers 16 at a corresponding half rate, so that proper rolling action of the balls 14 relative to the wire 11 is assured.

Since the rail spacer 46 rigid with the carriage 41 is in abutment with the arms 55 and 56 of the wire guides 50 and 51 respectively, as the carriage 41 is moved towards the right at half rate through the rolling drive action of the pinions 35, said guides 50 and 51 are urged in unison with said carriage. Thus, during the first third of total wire travel, the space between the rod 31 and guide 50 will progressively diminish, and will disappear when the wire 11 has completed its one-third travel. Thereafter, the rod 31 will push the wire guide 50 at twice its previous rate, while the wire guide 51 continues to travel at half rate.

During the second third of total wire travel, the space between wire guides 50 and 51 will diminish, until guide 50 abuts guide 51. Thereafter, during the last third of total wire travel, wire guide 51 will be pushed to the right by the rod 31 through the intervening wire guide 50 at twice its previous rate, until at the end of the wire stroke, wire guide 51 will abut rail spacer 47, rail spacer 48 will abut the end of sheath 12 and the sleeve 27 embracing said sheath, and the movable rack 37 will abut the flange of said sleeve 27. At this terminal stage of the wire stroke, the bifurcated ends of the wire guide arms 55 and 56 will be disposed at substantially equally spaced intervals along the rod 31 between the end extension 38 of the rack 37 and the rail spacer 46.

On the return stroke of the rod 31, i. e., to the left as viewed in Figs. 2 and 3, the procedure described in the preceding paragraph will be reversed. During this return movement, carriage 41 will be drawn to the left at one half the rate of rod 31, rack 37 and wire 11, and the abutting wire guides 50 and 51 will be urged by the rail spacer 47 rigid with said carriage and abutting the wire guide 51. During the first third of the return stroke, the rod 31 will be withdrawn from abutment with the wire guide 50, and the space between said rod and said guide will progressively increase until the end extension 38 of the rack 37 connected to said rod abuts the bifurcated end of wire guide arm 55, whence wire guide 50 rigid therewith will be urged to the left at twice its previous rate by rod 31. Thereafter, during the second third of return movement, the wire guide 50 will be withdrawn from abutment with guide 51, the space therebetween progressively increasing until arm 55 rigid with the wire guide 50 abuts the bifurcated end of arm 56 rigid with the wire guide 51 at the end of the second third of total movement of rod 31.

During the last third of the stroke, the wire guide 51, as well as the wire guide 50, will be urged by the rod 31 and the end extension of the movable rack 37 until, at the end of the stroke, further displacement will be arrested by the abutment of rails 45 with the flange of the hub 30, at which time the elements of the regulating mechanism will have resumed the position shown in Figs. 2 and 3.

During the cycle of operation described, the wire 11 passing through the sheath 12 transmits the force applied to rod 31 at one end of the cable assembly to a regulating mechanism 25 at the other end of said cable assembly similar to that described. Thus, the chain of ball retainers 16 shown in Figs. 3, 8 and 9 are urged in proper direction by the cooperation of both regulating mechanisms 25, one pulling and the other pushing.

Also, during the complete cycle, the portion of the wire 11 at each end of the cable assembly between the wire actuating rod 31 and the retaining driving rod 42 is supported, guided and braced against buckling by the wire guides 50 and 51. These wire guides 50 and 51 slidably move automatically by actuation of the rod 31 to maintain the wire 11 against buckling, as the distance between said rods 31 and 42 diminishes as a result of this rod actuation.

In the construction of Figs. 1-9, the regulating device 25 is shown in association with ball retainers 16 of the interlinked chain type. However, as far as certain aspects of the invention are concerned, this regulating device may be employed with unconnected ball retainers 16a of the type shown in Figs. 13 and 14, in which case these latter retainers would be pushed only by one or the other of the regulators at either end of the cable assembly 10.

Figs. 10, 11 and 12 show an alternative form of regulating mechanism 25a, whose function is the same as that of the regulating mechanism shown in Figs. 2 and 3. In this modified construction, the regulating mechanism 25a comprises a cylindrical housing 26a rigidly attached at its inner end to the outside of the sheath 12 by means of the flanged sleeve 27a embracing said sheath.

The outer or opposite end of the housing 26a has secured thereto the flanged hub 30a serving as a slide guide for the rigid rod 31a rigid with the end of the wire 11, and serving to facilitate attachment of said wire to a control or controlled element. This hub 30a is provided with screw threads or other suitable means to facilitate rigid mounting of the end of the cable assembly.

The half-rate movement of the ball retainers 16a is achieved by the use of a pair of diametrically opposed pinions 35a mounted for free rotation on a tubular carriage 41a, and adapted to roll between fixed racks 36a affixed to diametrically opposite sides of the housing 26a and rack teeth 37a on the rod 31a. The rack 37a slidable within the hub 30a is cylindrical to permit rod 31a and wire 11 to rotate, so that flexibility to the structure is afforded.

The carriage 41a has rigid therewith a hollow rod 42a engaging the chain of ball retainers 16a, and adapted to push said chain at half-rate towards the right (Fig. 10) as the wire 11 is actuated towards the right therein.

As the rod 31a is actuated towards the right (Fig. 10), the wire 11 is also moved towards the right. By means of the rolling drive action of the pinions 35a caused by this actuation, the carriage 41a is moved towards the right at half the speed of the wire 11, and this half-speed movement is, in turn, transmitted to the chain of ball retainers 16a by means of pusher rod 42a. As in the regulating mechanism 25 of Figs. 1-9, there will be a section of the wire 11 unsupported by the rod 31a or the rod 42a when the regulating mechanism 25a is in other than fully compressed condition. To prevent buckling of the wire 11 against the inner wall of the tubular carriage 41a when said wire is compressed, there is slidably mounted in said carriage a set of wire guides 50a and a set of wire guides 51a. The wire guides 50a are of V-shaped cross-section with their apices engaging the periphery of the wire 11 and their arms extending radially and in engagement with the wall of the tubular carriage 41a, and are equally spaced around said wire. These wire guides 50a are affixed to the end of the rod 31a and are adapted to slide in unison in either direction with said rod along the tubular carriage 41a.

The wire guides 51a are similar in design to the wire guides 50a, and are fixedly retained in the tubular carriage 41a by means of upset ears 70 at the ends of the side arms of said guides extending through respective apertures in the peripheral wall of said carriage. The wire guides 50a are alternately spaced between guides 51a, and at one end are retained with snug slide fits between adjoining guides 51a.

In the extended position shown in Fig. 10, the wire 11 is supported between the rods 31a and 42a by the alternately spaced wire guides 50a and 51a, these guides remaining in overlapped relationship in this extended position. As the wire 11 is moved towards the right (Fig. 10), the rod 31a engaging the guides 50a will slide said guides along the guides 51a and along the carriage 41a which is moving at half speed, thereby maintaining the section of the wire between the rods 31a and 42a effectively supported and braced against buckling.

During return movement, the actuation of the wire 11 from the other end of the cable assembly causes the ball retainers 16a to move towards the left at half speed (Fig. 10). Rack 37a and pinions 35a in turn displace the carriage 41a towards the left at half speed and the wire guides 51a therewith, while the wire guides 50a are moved at full speed with the rod 31a away from the wire guides 51a until the regulating device 25a has been restored to its original position shown in Fig. 10.

The retainer 16a employed in connection with the regulating device 25a shown in Figs. 10, 11 and 12, may be of the interlinked type shown in Figs. 8 and 9, or may be of the type shown in Figs. 13 and 14, in which the retainers are not interchained. In the form shown in Figs. 13 and 14, each of these ball retainers 16a is in the shape of a cage rounded at each end to permit the retainers to rollably tilt with respect to each other as the cable is bent, and holding a series of balls 14, four being shown, in rolling contact with the wire 11 and the inner periphery of the sheath 12.

Figs. 15, 16, 17 and 18 show a modified form of cable assembly in which instead of employing a regulating mechanism at one end or both ends of the assembly, there is employed a single regulating mechanism 25b disposed intermediately between the ends of the cable assembly. In this modified form of cable assembly, there is secured to each end of the sheath 12 a rigid housing 75 in the form of a cylindrical tube embracing the end of said sheath, and slidably receiving the rod 31b affixed to the end of the wire 11. Within the sheath 12 is a series of ball retainers 16, which are of the interlocked type shown in Figs. 8 and 9. To support the section of the wire 11 between the rod 31b and the chain of ball retainers 16 against buckling in extended position of said rod, there is provided a chain of interlocking wire guides 77 embracing the wire 11 and slidable in the housing 75. Each of said wire guides 77 may desirably be stamped from sheet material, and comprises an intermediate body 78 contoured for conforming engagement with the inner periphery of the housing 75, and formed at each end with ears or flanges 80 through which the wire 11 slidably passes. These wire guides 77 are alternately arranged, with the intermediate body 78 of one guide engaging one side of the wall of the housing 75, and the intermediate bodies of respective adjoining guides on opposite ends thereof engaging the opposite side of said housing wall.

The chain of guides 77 is attached at one end to the inner end of the rod 31b, and at its other end to the end of the train of ball retainers 16. As the rod 31b is displaced to the right (Fig. 16) at full speed, and the ball retainers 16 are moved to the right at half speed, the chain of wire guides 77 is compressed and thereby collapsed, while the wire 11 is supported against buckling.

The regulating mechanism 25b of Figs. 15 and 18 medially disposed with respect to the cable assembly, differs from the regulating mechanism 25 of Figs. 1–7 only insofar as is necessary to render mechanism 25b capable of double ended actuation of the ball retainers 16. In the cable assembly of Figs. 15–18, the force applied to rod 31b is transmitted as usual through wire 11 from one end of the flexible cable assembly to the other. The regulating mechanism 25b actuated by this operation comprises a cylindrical housing 26b attached at its ends to the sheath by means of the flanged sleeves 27b embracing said sheath.

Secured to the wire 11 in the housing 26b is a collar 85, engaging through the forked arm 38 the slidable rack 37b rigid with said arm, and similar in shape to a rack 37 in the construction of Figs. 1–7. A fixed rack (not shown) is provided similar to the rack 36 in the construction of Figs. 1–7, and similarly secured to the housing 26b opposite to the slidable rack 37b. Pinions 35b meshing with these racks and pivotally supported on the carriage 41b cause said carriage to be driven at half the speed rate of the wire 11. This carriage 41b has parallel rails 45b secured together by cross-pieces 46b, 47b and 48b. Slidably mounted on the rails 45b are the double-ended wire guides 50b and 51b. Guide 50b comprises two wire support plates 86 and 87 connected by an arm 88, and guide 51b comprises two wire support plates 90 and 91, connected by an arm 92, and encompassing therebetween the guide 50b, with the arm 92 slidably passing through slots in the wire support plates 86 and 87. The collar 85 connecting the wire 11 to the carriage 41b is positioned between the wire support plates 86 and 87 of the guide 50b. The two chains of interlocked retainers 16 on opposite ends of the regulating mechanism 25b are connected to the carriage 41b by the tubular members 94 and 95 embracing the wire 11 and affixed at their ends to the carriage cross-pieces 46b and 48b.

Fig. 18 shows the regulating mechanism 25b with the wire 11 partially displaced to the right. In the phase shown, the wire guide 50b is being urged to the right at full speed under the influence of the collar 85 abutting the support plate 87 of said wire guide, while the wire guide 51b is being urged to the right at half speed in unison with the carriage 41b, through the pushing action of the tubular member 94 on the wire support plate 90 forming part of the wire guide 51b. After the support plate 87 on the wire guide 50b reaches the support plate 91 on the wire guide 51b, the collar 85 and the guides 50b and 51b will proceed in unison at full speed with the wire 11 until the support plate 91 abuts the cross-piece 47b of the carriage 41b. In this limiting position, the wire 11 will be displaced to the right to the extent of its full stroke. In this extreme phase, wire support plates 90 and 86 are spaced at equal intervals between the tubular member 94 and the wire support plate 91 to support the exposed portion of the wire 11.

On the return stroke of the wire 11 to the left as viewed in Fig. 18, collar 85 will withdraw from abutment with the wire support plate 87 which is being urged to the left by the carriage 41b, but at half the rate of speed of the wire 11. As the wire 11 proceeds to the left at full speed, the collar 85 will engage support plate 86, and thereby urge the wire guide 50b toward the support plate 90 of the other wire guide 51b. As the wire guide 50b progresses in its movement towards the left, support plate 86 will about support plate 90, and thereby urge wire guide 51b at full speed in unison with collar 85 and wire guide 50b toward the end of the tubular member 94. As the wire 11 reaches the end of its stroke to the left, support plate 90 will abut the end of the tubular member 94, and the carriage rails 45b will abut the flange of sleeve 27b, thereby arresting further movement of the wire 11 to the left. In this limiting position, support plates 87 and 91 will be spaced at equal intervals between support plates 86 and the carriage cross-piece 47b, so that the exposed portions of the wire 11 will be effectively supported.

In some embodiments of the present invention, it may be desirable to combine the transmission of a linear force with a rotary force. To this end, a suitable spirally wound flexible shaft of the well-known type may be substituted for the wire 11 shown.

Aside from the flexible cable assembly as shown in Fig. 1, the various elements shown in the drawings may, in accordance with certain phases of the present invention, be combined with a flexible or rigid sheath, through which passes a push-pull, plus or minus torsion, wire or cable as follows: Two regulating mechanisms 25 or 25a or one of each may be used with either ball retainers 16 or 16a. One regulating mechanism 25 or 25a may be employed with ball retainers 16 and the guide means shown in Fig. 16. Two guide means shown in Fig. 16 may be employed with ball retainers 16, in which case the proper displacement of the retainers is dependent only on the rolling action of the balls 14.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A cable assembly comprising a sheath, a slender power transmitting element in said sheath movable lengthwise therealong to actuate a device by remote control, rollable bearing means for supporting said element in said sheath for lengthwise movement therein, and means automatically operable upon lengthwise movement of said power transmitting element for positively driving said supporting means in the direction of movement of said power transmitting element at a rate which is different from but predetermined with respect to the rate of lengthwise movement of said power transmitting element.

2. A flexible cable assembly comprising a sheath, a slender flexible power transmitting element in said sheath, movable lengthwise therealong to actuate a device by remote control, rollable bearing means for supporting said element in said sheath for lengthwise movement therein, and means automatically operable upon lengthwise movement of said power transmitting element for positively driving said supporting means in the direction of movement of said power transmitting element at a rate which is so related to the rate of lengthwise movement of said power transmitting element as to assure rolling movement substantially free from slippage between said power transmitting element and said bearing means.

3. A cable assembly as described in claim 1, in which said supporting means comprises bearing members which rollably engage said power transmitting element and the inner peripheral surface of said sheath, and which are adapted to be moved along said sheath by rolling action at half the speed of lengthwise movement of said power transmitting element, and said driving means is operable to positively drive said members at half the rate of lengthwise movement of said power transmitting element to assure proper rolling action of said members with respect to said power transmitting element and said sheath.

4. A cable assembly as described in claim 1, in which said supporting means comprises bearing balls held in retainers and rollably engaging said power transmitting element and the inner peripheral surface of said sheath, whereby said bearing balls are adapted to roll along said sheath at half the speed of lengthwise movement of said power transmitting element, said driving means being operable to positively drive said retainers at half the rate of lengthwise movement of said power transmitting element to assure proper rolling action of said balls with respect to said power transmitting element and said sheath.

5. A cable assembly as described in claim 1, in which said supporting means comprisese bearing balls arranged in groups, each group comprising a series of bearing balls disposed in the same plane around the power transmitting element, and having rolling engagement with said power transmitting element and the inner peripheral surface of said sheath, said groups of bearing balls being rollably mounted in respective retainers extending in end to end engagement in said sheath, said driving means being operable to positively drive said retainers at half the rate of lengthwise movement of said power transmitting element to assure proper rolling action of said bearing balls with respect to said power transmitting element and said sheath.

6. A flexible cable assembly as described in claim 2, in which said supporting means comprises bearing balls rollably engaging said power transmitting element and the inner peripheral surface of said sheath, and rollably supported in retainers extending in said sheath in end to end engagement, said end to end engagement between retainers being such as to permit said retainers to tilt freely relatively with respect to each other when said cable assembly is bent, said driving means being operable to positively drive said retainers at half the rate of lengthwise movement of said power transmitting element to assure proper rolling action of said bearing balls with respect to said power transmitting element and said sheath.

7. A cable assembly comprising a sheath, a slender power transmitting element in said sheath, movable lengthwise therealong to actuate a device by remote control, rollable bearing members supporting said element in said sheath for lengthwise movement therein, said bearing members rollably engaging said power transmitting element and the inner periphery of said sheath, and a regulating mechanism at one end of said cable assembly, automatically operable upon lengthwise movement of said power transmitting element for positively driving said bearing members in the direction of lengthwise movement of said power transmitting element, but at half the rate of said latter movement.

8. A cable assembly as described in claim 7, comprising a second regulating mechanism at the opposite end of said cable assembly, automatically operable upon lengthwise movement of said power transmitting element for positively driving said bearing members in the direction of lengthwise movement of said power transmitting element, but at half the rate of said latter movement.

9. A cable assembly comprising a sheath, a slender power transmitting element in said sheath, movable lengthwise therealong to actuate a device by remote control, rollable bearing members supporting said element in said sheath for lengthwise movement therein, said bearing members rollably engaging said power transmitting element and the inner periphery of said sheath, and a regulating mechanism intermediate the ends of the cable assembly, automatically operable upon lengthwise movement of said power transmitting element for positively driving said bearing members in the direction of lengthwise movement of said power transmitting element, but at half the rate of said latter movement.

10. A cable assembly comprising a sheath, a slender power transmitting element in said sheath, movable lengthwise therealong to actuate a device by remote control, rollable bearing members for supporting said element, and rollably engaging said power transmitting element and the inner peripheral surface of said sheath, whereby said bearing members are urged along said sheath at half the rate of said element, and means automatically operable upon lengthwise movement of said power transmitting element for positively driving said bearing members in the direction of movement of said power transmitting element at half the rate of lengthwise movement of said power transmitting element to assure proper rolling action of said bearing members with respect to said power transmitting element and said sheath, said driving means comprising a fixed rack, a rack mounted for movement with said power transmitting element, a carriage having a drive connection with said rollable bearing members, and a pinion on said carriage meshing with said racks.

11. A cable assembly as described in claim 10, in which said power transmitting element is flexible, said bearing members are arranged in groups, each group being supported on a retainer, the retainers are interlinked as a chain by connections which permit relative tilting of said retainers as the cable assembly is bent, and said carriage is connected to the chain of retainers to cause said retainers to move in either direction as the carriage is moved in a corresponding direction.

12. A flexible cable assembly as described in claim 10, in which a rigid rod is connected to said power transmitting element and is guided for slide movement, to move said element endwise upon endwise actuation of said rod, and said racks are separate from said rod and are mounted on opposite sides of said power transmitting element.

13. A flexible cable assembly as described in claim 10, in which a rigid rod is connected to said power transmitting element and is guided for slide movement, to move said element endwise upon endwise actuation of said rod, and the rack which is mounted for movement with said element forms part of said rod.

14. A flexible assembly as described in claim 10, in which a rigid rod is connected to said power transmitting element and is guided for slide movement, to move said element endwise upon endwise actuation of said rod, said driving means comprising a pair of fixed racks on opposite sides of said rod, rack teeth on opposite sides of said rod, a pair of pinions on opposite sides of said rod meshing with said rack teeth and said fixed racks, a carriage supporting said pinions, and a drive connection between said carriage and said bearing members.

15. A flexible cable assembly comprising a sheath, a slender flexible power transmitting element in said sheath, movable lengthwise therealong to actuate a device by remote control, bearing balls for supporting said element in said sheath for lengthwise movement therein, said bearing balls being arranged in groups, the bearing balls of each group extending around the power transmitting element in rolling engagement with said element and the inner periphery of said sheath, whereby upon movement of said power transmitting element endwise, said bearing balls will be driven in the same direction at one-half the rate of said power transmitting element, each of said groups of bearing balls being supported in a respective retainer, said retainers extending as a chain in end to end engagement and being pivotally interlinked at their ends, whereby said retainers may be moved along said sheath in unison upon the application of pulling or pushing force at one end of the chain of retainers, while permitting said retainers to be relatively tilted as the cable assembly is bent, a carriage, means automatically operable upon endwise movement of said power transmitting element in either direction for causing movement of said carriage in the same direction but at half the rate, and a connection between said carriage and the chain of retainers for transmitting the movement of said carriage to said retainers in either direction.

16. A flexible cable assembly comprising a sheath, a slender flexible power transmitting element in said sheath, movable lengthwise therealong to actuate a device by remote control, bearing balls for supporting said element in said sheath for lengthwise movement therein, said bearing balls being arranged in groups, the bearing balls of each group extending around the power transmitting element in rolling engagement with said element and the inner periphery of said sheath, whereby upon movement of said power transmitting element endwise, said bearing balls will be driven in the same direction at one-half the rate of said power transmitting element, each of said groups of bearing balls being supported in a respective retainer, said retainers extending in end to end abutting engagement in a row, but being separable, said abutting engagement of the retainers being such as to permit said retainers to tilt relatively as the cable assembly is bent, a carriage at each end of said row of retainers, means automatically operable upon endwise movement of said power transmitting element in one direction for causing movement of one of said carriages in the same direction, but at half the rate, a connection between said latter carriage and the adjoining end of said row of retainers for pushing said row of retainers as said latter carriage is moved, means automatically operable upon endwise movement of said power transmitting element in the opposite direction for causing movement of the other carriage in the latter direction, and a connection between said latter carriage and the adjoining end of said row of retainers for pushing said row of retainers in the latter direction as said latter carriage is moved in said latter direction.

17. A flexible cable assembly comprising a sheath, a flexible slender power transmitting element in said sheath, movable lengthwise therealong to actuate a device by remote control, a rigid member connected to said power transmitting element for moving said element endwise as said rigid member is actuated, a series of rollable bearing members arranged along said sheath for supporting said element in said sheath for lengthwise movement therein, and spaced from said rigid member, whereby a section of said element is free from support from said rollable bearing members or said rigid member, said bearing members rollably engaging said element and the inner wall of said sheath, and being moved along said sheath relative to said element by the rolling movement of said bearing members along said inner sheath wall, the spacing between said rigid member and said series of bearing members varying as said rigid member is moved towards said series of bearing members, and means for supporting said section of said element at an intermediate region against buckling, and comprising a guide for said element and means for sliding said guide along the length of said element and substantially with said bearing member as said element is moved endwise and said spacing is varied to maintain said element supported at said intermediate region against buckling, during the endwise movement of said element.

18. A flexible cable assembly as described in claim 17, in which the means for supporting said section of said element comprises a second slidable guide for said element spaced from said first guide and disposed between said first guide and said rigid member, and a drive connection between said rigid member and said second guide, whereby said guides are maintained in position to support said element against buckling during the complete stroke of said element and said second guide is moved towards said first guide at least in the last periods of the inward stroke of said rigid member.

19. A flexible assembly as described in claim 17, in which the means for supporting said section of said element comprises a series of guides, each comprising an intermediate body slidable along the inner wall of the sheath, and ears at each end of said body through which the element passes with a slide fit, each of said guides being arranged in reverse relationship with respect to the adjoining guides, the end guide nearest said bearing members being mounted for slide movement with said bearing members and the end guide nearest said rigid member being mounted for movement with said element, whereby said guides are collapsed as said spacing decreases while supporting said element against buckling.

20. A flexible cable assembly as described in claim 17, in which the means for supporting said section of said element comprises a pair of spaced slidable guide plates through which said element passes with a slide fit, said plates having their radially outer ends in slide engagement with the inner walls of said sheath, said flexible cable assembly comprising means for moving said guide plates along said section upon endwise movement of said element in either direction to maintain said guide plates in position to support said element against buckling during complete stroke of said element, said latter means including a drive connection between said rigid member and one of said plates, and a drive connection between the series of bearing members and the other plate.

21. A flexible cable assembly as described in claim 17, in which the means for supporting said section of said element comprises two sets of supporting members, each set comprising a plurality of members of V-shaped cross-section arranged around said power transmitting member and each having its apex supportably engaging said power transmitting element, the members of one set being staggered with respect to the other and overlapping in extreme extended position of said element, one of said sets being mounted for movement with said rigid member, and the other set being mounted for movement with said bearing members, the two sets of supporting members being adapted to telescopically collapse in overlapping relationship as the element is moved to diminish the length of said element section while supporting said section against buckling.

22. A flexible cable assembly comprising a sheath, a slender flexible power transmitting element in said sheath, movable lengthwise therealong to actuate a device by remote control, a series of separate ball retainer cages in said sheath mounted in end to end engagement in a manner to permit said cages to tilt relatively, a plurality of balls rollably mounted in each of said cages, and arranged around said element in rolling engagement therewith and the inner wall of said sheath, whereby upon endwise movement of said element, said balls are urged to move in the same direction but at half the rate, said retainer cages being mounted to move as a unit with said balls relative to said element.

23. A flexible cable assembly as described in claim 22, in which the retainer cages are not connected together, but have end to end free abutting engagement.

24. A flexible cable assembly as described in claim 22, in which the retainer cages are directly interlinked end to end by swivel connections to form a chain of cages.

25. A flexible cable assembly as described in claim 22, in which said sheath presents a unitary continuous cylindrical inner wall surface in engagement with said balls, said sheath being constructed to permit it to be bent acutely without collapsing.

26. A flexible cable assembly, comprising a sheath, a flexible slender power transmitting element in said sheath, movable lengthwise therealong to actuate a device by remote control, a rigid member connected to said power transmitting element for moving said element endwise as said rigid member is actuated, a series of rollable bearing members arranged along said sheath for supporting said element in said sheath for lengthwise movement therein and spaced from said rigid member, whereby a section of said element is free from support from said rollable bearing members or said rigid member, said bearing members rollably engaging said element and the inner wall of said sheath, and moved along said sheath relative to said element by the rolling movement of said bearing members along said inner sheath wall, and means for supporting said section of said element at an intermediate region against buckling, and comprising means for collapsing and extending said latter means automatically in accordance with the movement of said element endwise to maintain said intermediate region supported against buckling during movements of said element between its two extreme endwise positions, said latter means in said extreme positions of said element predetermining and limiting the position of said series of bearing members along said sheath.

27. A flexible cable assembly as described in claim 26, in which said element is a wire and said section supporting means comprises a series of wire guides, each of U-shaped longitudinal section having ears at the ends through which said wire passes with a slide fit, said guides being arranged with their ears interlocked against endwise movement tending to separate said guides in one outward extreme position of said rigid member, while permitting said series of guides to collapse when said rigid member is moved inwardly from said outward extreme position.

28. A flexible cable assembly as described in claim 27, in which the end wire guide nearest said rigid member is connected to said rigid member for endwise movement therewith, while the other end wire guide nearest said series of bearing members is connected to said latter series for endwise movement therewith.

PETER J. McLAREN.
JOHN A. VAUGHAN.
VICTOR A. SVENSSON.

REFERENCES CITED

The following references are of record in the file of this patent:

UNITED STATES PATENTS

| Number | Name | Date |
|---|---|---|
| 1,506,334 | Bovey | Aug. 26, 1924 |
| 1,930,272 | Huck | Oct. 10, 1933 |
| 2,128,986 | Chilton | Sept. 6, 1938 |

FOREIGN PATENTS

| Number | Country | Date |
|---|---|---|
| 702,530 | France | Jan. 26, 1931 |